United States Patent Office 3,573,942
Patented Apr. 6, 1971

3,573,942
CURING AGENT FOR DAMP CONCRETE
Willy K. Wassenberg, Aachen, and Axel K. Commichau, Hamburg-Rissen, Germany, assignors to Mobil Oil Corporation, New York, N.Y.
No Drawing. Filed Dec. 8, 1967, Ser. No. 688,997
Claims priority, application Germany, Dec. 8, 1966,
M 71,968
Int. Cl. C08h *11/00;* C08f *19/14*
U.S. Cl. 106—227                                    12 Claims

ABSTRACT OF THE DISCLOSURE

A curing agent for damp concrete is provided comprising a cationically adjusted dispersion of a resin, a drying oil, a solvent for said resin, an amine-containing emulsifier and water.

CROSS REFERENCE TO RELATED APPLICATION

German patent application M 71,968 filed Dec. 8, 1966, of which convention priority is claimed.

BACKGROUND OF THE INVENTION

(1) Field of the invention

This invention relates to the curing of damp concrete, and relates more particularly to the improved curing of damp concrete mixtures for the purpose of avoiding damage to the structure of the concrete during the critical setting period.

(2) Description of the prior art

The process for setting and hardening of damp concrete mixtures occurs through the completion of a multitude of chemical reactions in the cement, which are caused by the presence of water. This condition is particularly encountered where hard-as-stone solidification of the concrete mixture is desired. Lack of water during the critical setting period results in damage to the structure of the concrete. Shrinkage cracks can form and the strength factors can drop. Water, lost through evaporation, can not be added at the beginning of the setting period, in the form of an excess of mixing water, since excess of the amount needed for the setting process to occur, also affects the strengthening properties of the concrete. Thus, all conditions which prevent the loss of water due to atmospheric influence, such as sunlight, temperature of the air, or wind, to any considerable extent, are, therefore, of great importance.

Prior to the present invention, the short-term initial treatment method during the setting process in concrete road-building, consists of using protective roofs and subsequently covering the concrete with straw mats, jute sheets, a layer of sand and continual moistening of the covering. This type of curing however, not only takes up considerable time and is expensive, but is also difficult to control, and, in practice, is not feasible. Furthermore, it is found that aftertreatment can not begin until the concrete has become somewhat firm, i.e. when some of the water present has evaporated.

Curing agents for road concrete are known which are sprayed onto the surface of the concrete when it becomes dull, and then form a film which is intended to prevent substantial loss of water. It is necessary, however that these curing agents be sprayable at normal concreting temperature; that they have as high a flash point as possible; that they are physiologically safe; that they contain no substances harmful to the concrete; that the blocking action of the film produced with the curing agent against loss of water from the concrete, attains a cerain minimum; that when the film has dried, it is not adhesive; and, finally, that the non-skid property of the road is not impaired. Known curing agents only partly meet these demands. With the application of products on a solvent base, precautions must be taken because of the danger of ignition, and certain solvents have been found to have disadvantageous physiological effects on the personnel working with them.

Attempts have heretofore been made to produce curing agents from wax, wax-like substances, greases, paraffin, preferably with solvents with the aid of soaps or anionic or cationic emulsifiers, but these agents have not been found to be fully satisfactory. For example, where the agent contains paraffin, the dispersed or emulsified particles are precipitated when the concrete is being cured, and deposit themselves on the base and form a smeary, sticky film. As a result, the frictional resistance of the surface is reduced, which is a great disadvantage for roads, highways, and particularly airport runways, because the braking distance is thereby considerably lengthened. Furthermore, due to the water-repelling nature, the layer of wax acts as a separating layer when other layers of mortar, plaster or concrete are later applied. The layer of wax, therefore, usually must be removed by scrubbing with steel brushes, which takes up considerable time. Finally, the adhesion of paints, lacquers, markings and other top or protective coatings is impaired, with the result that in most cases it is necessary to remove the layer of wax before it is finally degraded.

SUMMARY OF THE INVENTION

In accordance with the present invention, improved curing agents for damp concrete are provided, which can be applied in the form of aqueous emulsions as soon as the concrete has become dull, which fully satisfy the aforementioned requirements. More specifically, the improved curing agents comprise a cationically adjusted dispersion of a resin, drying oil, a solvent for said resin, an amine-containing emulsifier and water. Preferably, the curing agent, based on the total weight of the dispersion, comprises the resin in an amount from about 1 to about 20 percent; the drying oil in an amount from about 0.1 to about 10 percent; the solvent in an amount from about 0.1 to about 10 percent; and the emulsifier in an amount from about 0.1 to about 20 percent. The dispersion may also contain, if so desired, from about 1 to about 10 percent lithopone and, also, from about 1 to about 10 percent of an antifreeze.

In accordance with the method of the present invention, the curing agent is preferably applied, by spraying, onto the surface of the concrete before it has set, that is, at a time when it is not yet possible to cover the concrete and to keep it moist. The protection of the concrete with the curing agent thus becomes effective during the solidification and initial hardening. In practical use, the quantity of the dispersion, prepared in accordance with the present invention, is preferably employed in an amount of approximately 100 to 300 grams per square meter, and, still more preferably, in an amount of 200 grams per square meter of the concrete. It is possible to employ larger quantities of the curing agent, but such use does not bring about any substantial degree of improvement.

The manner of the action of the dispersion, prepared in accordance with the present invention, resides in the dispersion, having been sprayed onto the dull fresh concrete, wetting the surface of the concrete, and in the solid particles of the dispersion being precipitated on the concrete through contact with it. Because of the presence of the resin, the fresh film results in producing a satisfactory consistency, and later on adheres to the base with the required firmness.

In accordance with the present invention, resins which easily crack and easily degrade (decay) or disappear, are suitable. Such resins are exemplified by natural resins, such as colophony; or synthetic resins, such as terpene polymerisates (carbo-resins); thermoplastic petroleum resins, such as escorez; and cumarone resins. The drying oils may comprise such self-drying oils as linseed oil or boiled linseed oil. These oils act as solvents for the resin and at the same time make the film flexible and durable. The solvent for the resin is one which possesses only slight-water solubility and it is essential that it can evaporate a short time after spraying of the dispersion. Such solvents are, preferably, those boiling within the range from about 212 to 572° F. (100 to 300° C.), such as chlorinated hydrocarbons, alkylated aromatics, turpentine or tetralin. Tetralin has proved particularly effective. The amine-containing emulsifier may comprise saturated or unsaturated alkyl amines or alkyl diamines, or aryl amines and amine salts of organic or inorganic acids, in which the amines contain from about 5 to about 30 carbon atoms. The higher fatty amines, such as talgamines, are preferred. The fatty amine salts, or salts of organic or inorganic acids are preferably amine salts of such acids as acetic acid or hydrochloric acid with a long-chain amine or diamine.

The antifreeze may be any water-soluble antifreeze such as glycol, di- or triethylene glycol or glycerine. By the addition of lithopone to the aforementioned mass, a product is obtained which supplies the concrete with an easily visible white curing film. This provides a visual control of the quality of curing agent required in each case, while it is being sprayed on, and a very even protective film on the surface of the concrete, is thus achieved. In addition, lithopone serves to reflect the rays of the sun, thus reducing the temperature effects on the concrete, which change according to the time of day.

DESCRIPTION OF SPECIFIC EMBODIMENTS

As is shown in the following tables, the product prepared in accordance with the present invention, meets all of the aforementioned requirements and is superior to the conventional curing agents. Particular emphasis is placed on the non-skid property of the surface of the concrete, which is better both immediately and within a few days after the film has dried out, than is obtained with known emulsions.

In the following Table I, two examples are disclosed of the composition of the curing agents of the present invention. The properties of these curing agents are compared with a commercially available emulsion, in Table II, with the components being indicated in percent by weight.

TABLE I

|  | Percent | |
|---|---|---|
|  | Example 1 | Example 2 |
| Paraffin | 8.8 | 8.0 |
| Cumarone resin | 1.4 | 1.3 |
| Boiled linseed oil | 2.4 | |
| Tetralin | 2.2 | 2.0 |
| Talgamin | 2.2 | 2.0 |
| Stearyl amine acetate | 2.0 | 2.0 |
| Lithopone | 2.0 | 2.0 |
| Ethylene glycol | | 1.8 |
| Perchloroethylene | 79.0 | 80.9 |
| Water |  |  |

TABLE II

|  | Commercial wax emulsion | Example 1 | Example 2 |
|---|---|---|---|
| Base | Wax | Artificial resin | Artificial resin. |
| Blocking action against evaporation of water. | Good; 50% | Good; 50% | Good; 50%. |
| Non-skid property of the surface film | Normal | Very good | Very good. |
| Physiological objections | None | None | None. |
| Pumpability in automatic pumps | Good | Good | Good. |
| Sprayability | do | do | Do. |
| Decaying | do | Very good | Very good. |
| Flash point | None | None | None. |
| Drying time | Normal | Normal | Normal. |

We claim:
1. A curing agent for damp concrete comprising a cationically adjusted dispersion of a resin selected from the group consisting of colophony, terpene polymerisates, thermoplastic petroleum resins and cumarone resins, a drying oil, a solvent for said resin, an amine-containing emulsifier and water, wherein, based on the total weight of said dispersion, said resin is present in an amount from about 1 to about 20 percent; said drying oil is present in an amount from about 0.1 to about 10 percent; said solvent is present in an amount from about 0.1 to about 10 percent; and said emulsifier is present in an amount from about 0.1 to about 20 percent.

2. The curing agent of claim 1 wherein said resin is escorez.

3. The curing agent of claim 1 wherein said drying oil is linseed oil.

4. The curing agent of claim 1 wherein said solvent has a boiling point from about 100° C. to about 300° C.

5. The curing agent of claim 1 wherein the solvent is selected from the group consisting of chlorinated hydrocarbons, alkylated aromatics, turpentine and tetralin.

6. The curing agent of claim 1 wherein said amine-containing emulsifier is selected from the group consisting of saturated and unsaturated alkyl amines and alkyl diamines, aryl amines and amine salts of organic and inorganic acids, said amines containing from about 5 to about 30 carbon atoms.

7. The curing agent of claim 1 wherein said emulsifier is a talgamine.

8. The curing agent of claim 1 wherein the curing agent contains as an additional component from about 1 to about 10 per cent, by weight, of an antifreeze.

9. The curing agent of claim 1 wherein said curing agent contains as an additional component from about 1 to about 10 percent, by weight, lithopone.

10. A method of curing damp concrete which comprises applying to the surface of said concrete a curing agent as defined in claim 8.

11. A method for curing damp concrete which comprises applying to the surface of said concrete a curing agent as defined in claim 1.

12. A method for curing damp concrete which comprises applying to the surface of said concrete a curing agent as defined in claim 9.

References Cited

UNITED STATES PATENTS 2,033,120  3/1936  Brother _____ 106—227
2,426,277  8/1947  Miller _____ 106—227

FOREIGN PATENTS 1,293,145  4/1962  France _____ 260—29.6

MORRIS LIEBMAN, Primary Examiner
L. T. JACOBS, Assistant Examiner

U.S. Cl. X.R.

260—18, 23.3, 29.2, 29.6

PO-1050 (5/69)

UNITED STATES PATENT OFFICE
CERTIFICATE OF CORRECTION

Patent No. 3,573,942　　　　　Dated April 6, 1971

Inventor(s) WILLY KARL WASSENBERG and AXEL KLAUS COMMICHAU

It is certified that error appears in the above-identified patent and that said Letters Patent are hereby corrected as shown below:

Column 1, line 21 after "M 71,968" add --IVc/22g--

Signed and sealed this 13th day of July 1971.

(SEAL)
Attest:

EDWARD M. FLETCHER, JR.
Attesting Officer

WILLIAM E. SCHUYLER,
Commissioner of Patent